Feb. 13, 1934.  O. E. JUVINALL  1,946,796
METER WIRE COVER
Filed Feb. 20, 1932    2 Sheets-Sheet 1

INVENTOR.
Orla E. Juvinall.
BY E. E. Vrooman & Geo.,
His ATTORNEYS.

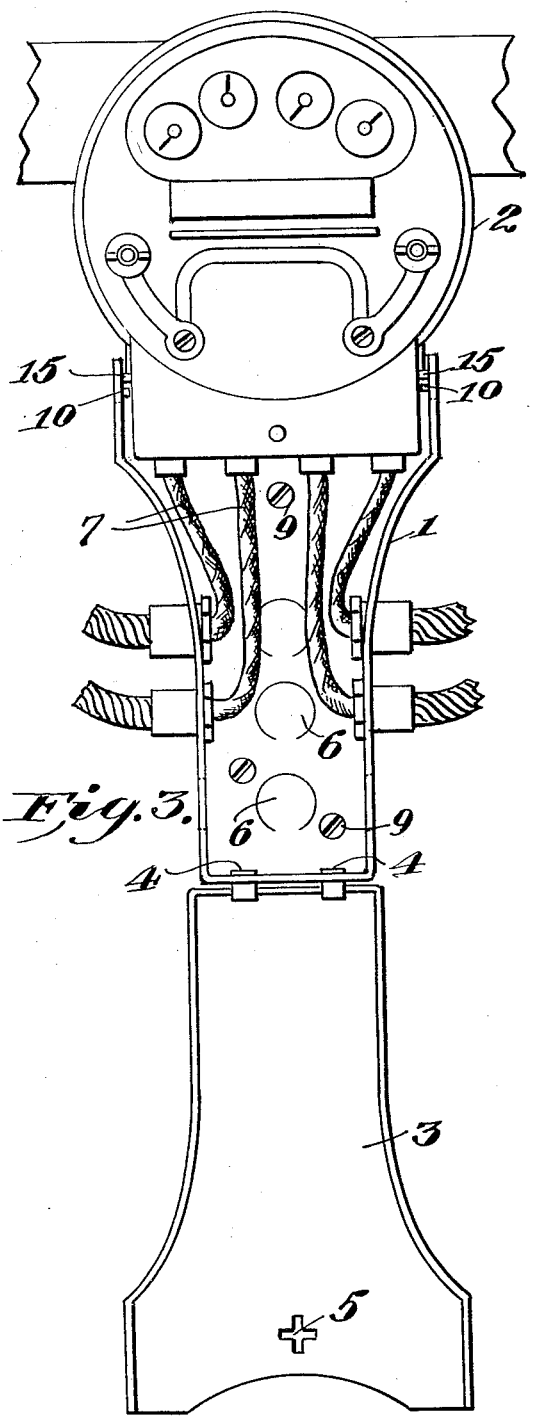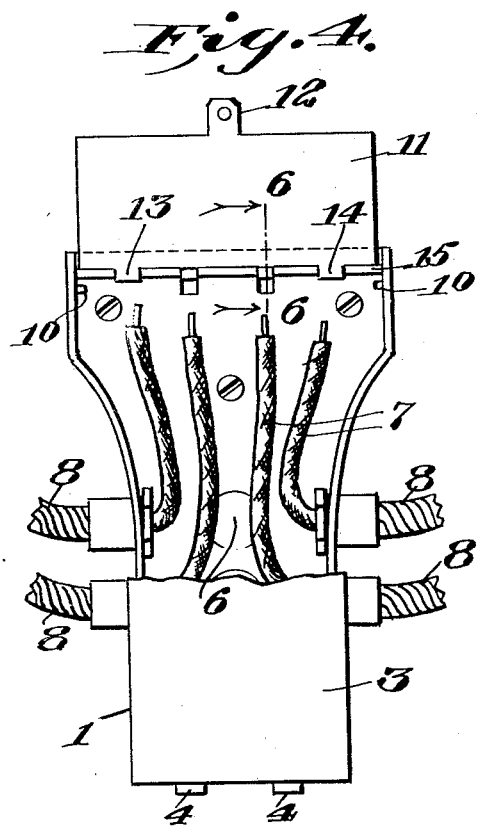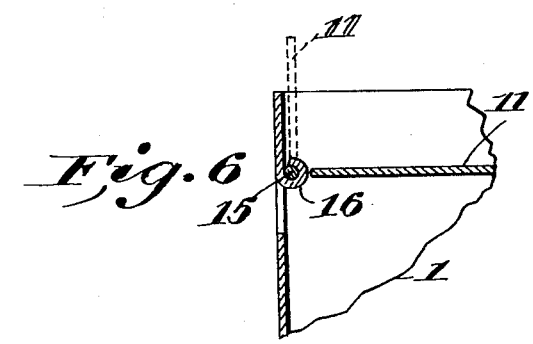

Patented Feb. 13, 1934

1,946,796

UNITED STATES PATENT OFFICE 1,946,796

METER WIRE COVER

Orla E. Juvinall, Danville, Ill., assignor of one-half to George R. Martin, Danville, Ill.

Application February 20, 1932. Serial No. 594,334

3 Claims. (Cl. 247—2)

This invention relates to a meter wire cover.

An object of the invention is the construction of a simple and efficient cover for the electric wires so as to prevent them from being tampered with, or the current fraudulently utilized, whether the electric meter is in an operative position, or said meter entirely removed.

Another object of the invention is the construction of a simple and efficient cover device for the wires usually attached to an electric meter, which device can be manufactured at a relatively low price.

A still further object of the invention is the construction of a wire cover, whereby the wires can be passed into the same from any side or back, and wires can not be fraudulently tampered with, whether connected to an electric meter, or the meter entirely absent.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 3 is a view in elevation, showing the device in an open position.

Figure 4 is a view partly in front elevation and partly in section of the device, with the electric wire extending therein.

Figure 6 is a sectional view taken on line 6—6, Figure 4 and looking in the direction of the arrows.

Figure 1:
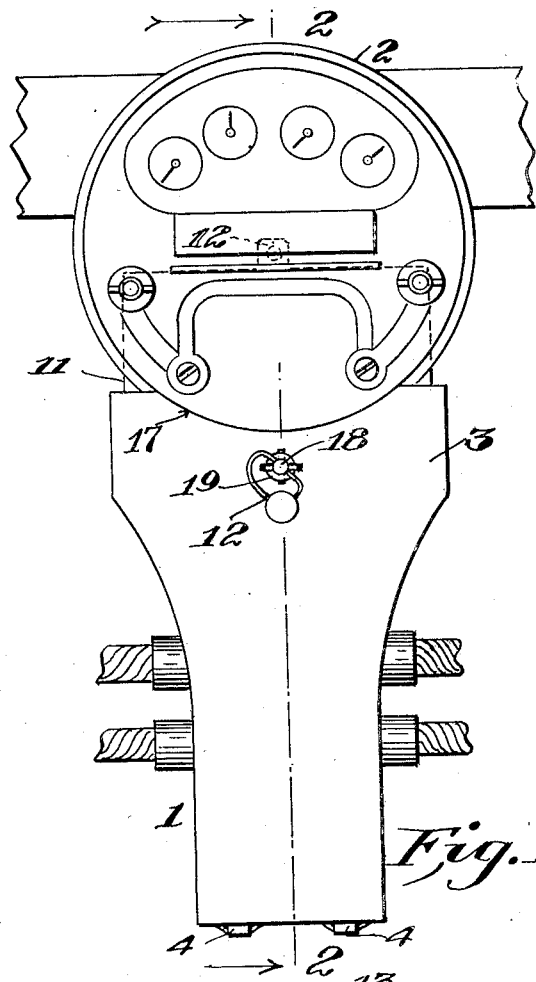
Figure 1 is a view in front elevation of a device constructed in accordance with the present invention and shown assembled with an electric meter.

Referring to the drawings by numerals, 1 designates a casing of any suitable material and of any suitable design, which is adapted to fit snugly against an electric meter 2. The casing 1 has a front cover 3 hingedly connected thereto at 4, 4. This front cover 3 has preferably a star-shape opening 5 near the upper end thereof, for the purpose hereinafter described. The casing 1 is provided on its two sides and in its back with knock-out discs 6, whereby the electrician can easily produce new holes or openings in the casing for the entrance of wires 7 therein. These wires 7 may be enclosed by suitable covering, or pipes 8, as the operator desires. The wires 7 are connected to the electric meter 2 in any suitable manner. The casing 1 is fastened to a suitable support 8 preferably by means of screws 9.

Figure 5:
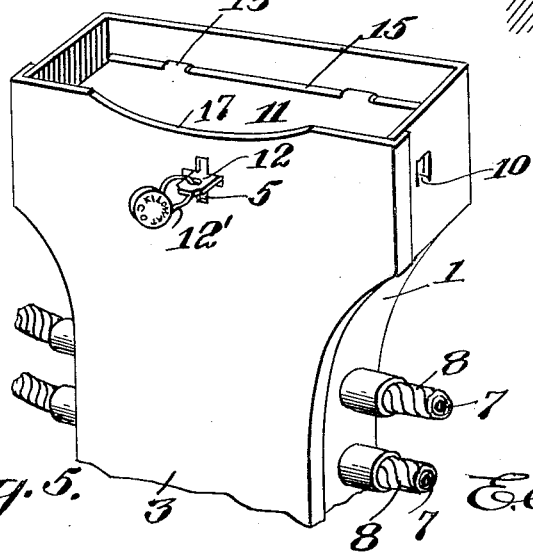
Figure 5 is a fragmentary perspective view of the device shown in a closed and locked condition.

On the sides of the casing 1 and positioned in horizontal alignment are punched in lugs 10. These lugs 10 hold the inner or top cover 11 in a horizontal position (Fig. 5). This cover 11 is provided with a lock tongue 12 that extends through the front opening 5 of the primary or outer cover 3, as shown in Fig. 5, with a seal 12 extending through the tongue for locking the two covers 3 and 11 in a closed position for preventing the wires 7 from being tampered with when the electric meter is removed, as in the case of a house or building being unoccupied. The auxiliary or top cover 11 is provided with eye tongues 13 (Fig. 4) wrapped around rod 15, and rod 15 is supported upon eye tongues 16 formed from the back of the casing 1, as clearly shown in Fig. 6.

Figure 2:
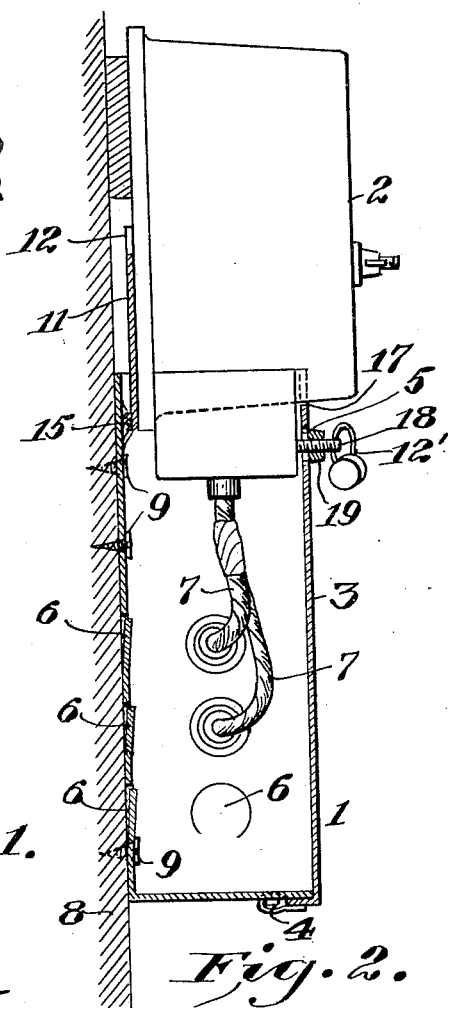
Figure 2 is a vertical sectional view taken on line 2—2, Figure 1, and looking in the direction of the arrows.

When the electric meter 2 is in position, it fits snug within the cut-out portion 17, and the auxiliary or top cover 11 is in a vertical position behind the meter as shown in Fig. 2. The bolt 18, of the meter, extends through opening 5, with nut 19 screwed tightly against the front cover 3, and seal 12 on the bolt preventing the wires from being fraudulently tampered with.

From the foregoing description, it will be understood that I have produced an inexpensive cover for the wires of an electric meter, which will work equally as well, when the meter is installed, as when the meter is entirely removed, to prevent the wires from being tampered with or the electricity being fraudulently used, since the cover is sealed by the electric company's seal, whether the current is being used through the meter or whether the meter has been removed and the current no longer used.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claims.

What I claim is:

1. In a device of the class described, the combination with a meter provided with an outwardly extending bolt, of a casing having its upper end partly around the bottom of said meter, said casing provided with a top cover hingedly connected to its back and extending up behind said meter, said casing provided with a front cover, said front cover provided near its upper end with an opening registering with said bolt, and said bolt normally extending through said opening and adapted to receive fastening means.

2. In a device of the class described, the combination of a casing provided on its sides with punched-in lugs, a top cover hingedly connected to the back of said casing and normally resting on said lugs, said top cover provided with a lock tongue, a front cover provided with an opening hingedly mounted on said casing, with said lock tongue extending through said opening, and means on the casing for permitting wires or the like to be threaded therein.

3. As a new article of manufacture, a meter wire cover, comprising a casing, said casing provided in opposite sides and near its top with inwardly extending lugs, a top cover down in said casing below its top and hingedly connected to the back of the casing, said top cover adapted to rest on the top of said inwardly extending lugs, said top cover provided with an outwardly extending integral lock tongue, a front cover hingedly mounted at its lower end on said casing and provided near its top in horizontal alignment with said integrally extending lugs with an opening, and said tongue adapted to extend through said opening when said parts are closed and said top cover resting on said inwardly extending lugs, substantially as shown and described.

ORLA E. JUVINALL.